(12) United States Patent
Okamatsu (10) Patent No.: US 7,525,780 B2
(45) Date of Patent: Apr. 28, 2009

(54) LIQUID CRYSTAL TELEVISION AND BACKLIGHT POWER SUPPLYING CIRCUIT

(75) Inventor: Tsukasa Okamatsu, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 161 days.

(21) Appl. No.: 11/786,333

(22) Filed: Apr. 11, 2007

(65) Prior Publication Data

US 2007/0241694 A1    Oct. 18, 2007

(30) Foreign Application Priority Data

Apr. 12, 2006    (JP) .............................. 2006-110109

(51) Int. Cl.
    *H02H 3/20*    (2006.01)
(52) U.S. Cl. .............................. 361/90; 361/89; 361/38; 361/35; 361/71; 315/224; 315/291; 315/307; 315/209 R
(58) Field of Classification Search ............ 361/18, 361/21, 20, 35, 38, 52, 56, 57, 59, 60, 71–75, 361/88–90, 91.1, 91.2, 91.3, 91.4, 91.5, 91.6, 361/92, 93.4, 93.5, 93.7, 94–97; 315/247, 315/246, 291, 307–311, 209 R, 224, 225, 315/93, 91, 88, 86; 345/102, 204, 211, 21
See application file for complete search history.

(56) References Cited

U.S. PATENT DOCUMENTS 6,504,691 B1 *   1/2003   Matsui et al. .................. 361/38
7,031,130 B2 *   4/2006   Simonelli et al. .......... 361/93.1

FOREIGN PATENT DOCUMENTS

| JP | 08-255690   | 10/1996 |
| JP | 2004-342321 | 12/2004 |
| JP | 2004-355865 | 12/2004 |

OTHER PUBLICATIONS

Japanese Notice of the reason for refusal, dated Apr. 9, 2008.

* cited by examiner

*Primary Examiner*—Tuyet Vo
(74) *Attorney, Agent, or Firm*—Yokoi & Co., U.S.A., Inc.; Peter Ganjian (57) ABSTRACT

Disclosed is an inverter-circuit power supply circuit capable of redriving an inverter circuit upon temporary blackout without turning on a main power again An inverter-circuit power supply circuit according to the present invention cuts off a backlight driving signal from a microcomputer (11*d*2) with a Zener diode (18*a*), a first transistor (19*a*), and a second transistor (20*a*) when a power supply voltage from a main power supply circuit (12*a*) is lowered, by use of a power recovery circuit (12*c*3) to thereby cancel a protective function of a protective circuit (17).

4 Claims, 6 Drawing Sheets

LIQUID CRYSTAL TELEVISION AND BACKLIGHT POWER SUPPLYING CIRCUIT

CROSS REFERENCES TO RELATED APPLICATIONS

The present application is related to the Japanese Patent Application No. 2006-110109, filed Apr. 12, 2006, the entire disclosure of which is expressly incorporated by reference herein.

BACKGROUND OF THE INVENTION

1. Field of the Invention

The present invention relates to a backlight power supplying circuit for supplying power to a backlight. In particular, the invention relates to a backlight power supplying circuit having a function of protecting the circuit against voltage drop, and to a liquid crystal television (TV) with use of the backlight power supplying circuit.

2. Description of the Related Art

Figure 6:
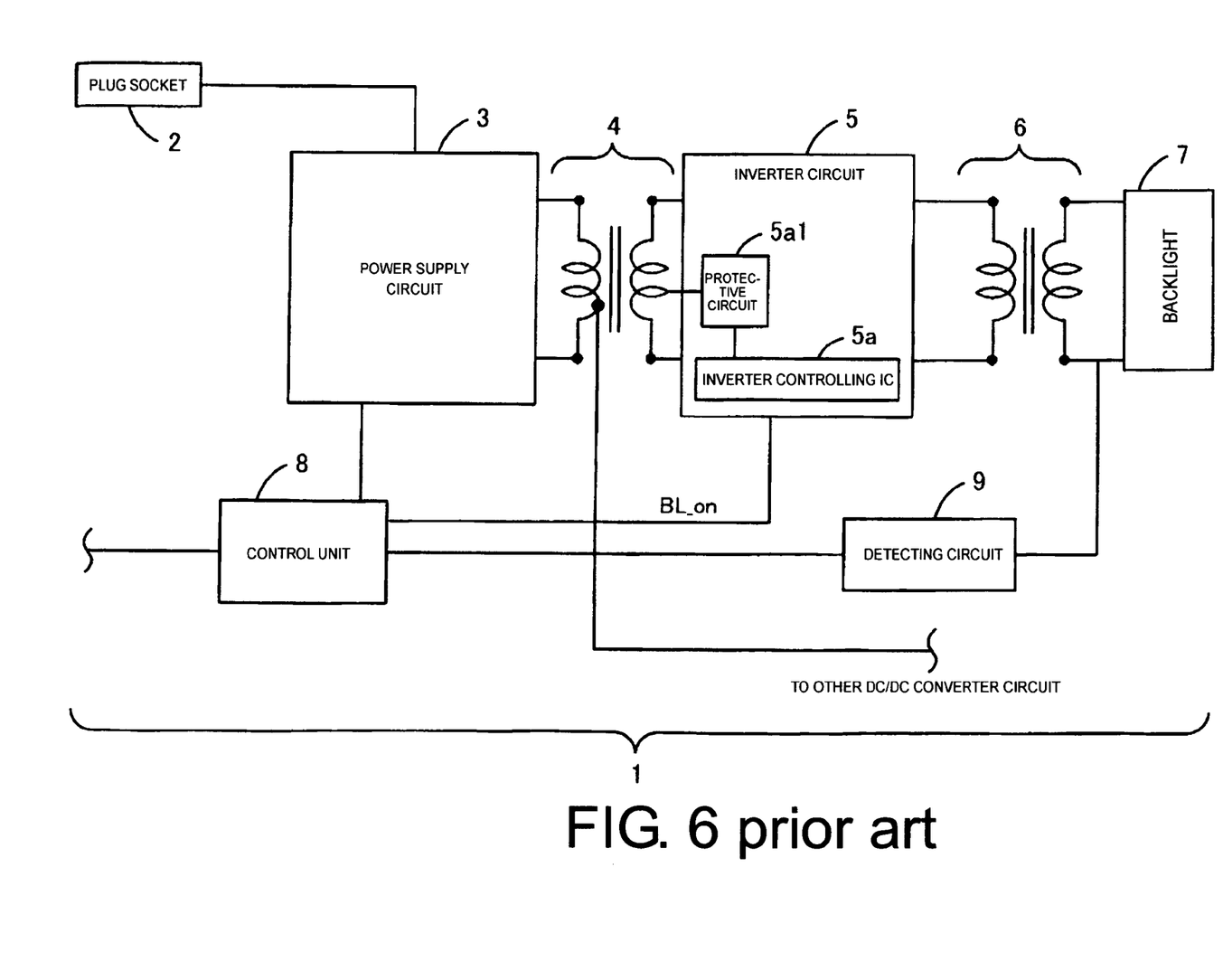
FIG. 6 shows a conventional backlight power supplying circuit.

FIG. 6 shows a conventional backlight power supplying circuit. As shown in FIG. 6, a backlight power supplying circuit 1 includes a main power supply circuit 3, a main transformer 4, an inverter circuit 5, a transformer 6, a control unit 8, and a determining circuit 9. The main power supply circuit 3 rectifies and reduces a voltage of a commercially available 100V AC power supply, which is input from a plug socket 2, and the voltage is divided at the main transformer 4 to thereby supply power to the inverter circuit 5. Further, the main transformer 4 supplies power to various circuits other than the inverter circuit 5. The inverter circuit 5 is intended to increase the voltage divided through the main transformer 4 due to the switching action of a MOSFET etc. up to an output voltage level necessary for the backlight 7. In this case, such MOSFETs execute a switching function behind the control of the inverter controlling IC 5a incorporated into the inverter circuit 5.

The control unit 8 controls driving of the main power supply circuit 3 and the inverter circuit 5. In response to an instruction to turn the power on the backlight 7 by means of a remote controller (not shown), the control unit 8 starts driving the main power supply circuit 3 and sends a signal BL_on that triggers the inverter controlling IC 5a to execute the switching function. As a result, the inverter circuit 5 boosts the power supply voltage input through the main transformer 4 and outputs the boosted voltage to the backlight 7 through the transformer 6. Further, a secondary coil of the transformer 6 makes determination about the output voltage for the backlight by means of the determining circuit 9. If the determining circuit 9 detects any abnormality in output voltage, a feedback signal is sent to the control unit 8. The control unit 8 receives the feedback signal to control the power supply of the main power supply circuit 3.

However, if a voltage of the commercially available power supply, which is supplied from the plug socket 2, drops due to temporary blackout (momentary blackout), a power supply voltage input from the main power supply circuit 3 through the transformer 4 is, of course, lowered, with the result that a voltage level of the signal BL_on lowers. At this time, the inverter controlling IC 5a stops driving the inverter circuit 5 without recognizing the signal BL_on. The inverter controlling IC includes, as a protective functional unit, a protective circuit 5a1 that stops driving the inverter circuit 5 when a voltage level of the signal BL_on is lowered. Since the output voltage generated with the inverter circuit 5 is abnormally as high as 1000 V, the protective circuit temporarily cuts off the supply of the signal BL_on from the control unit 8 (cuts off a main power supply) to thereby prevent the backlight 7 from being damaged due to malfunction of the inverter circuit 5. Hence, upon such temporary blackout, a user needs to turn on the main power supply again to redrive the liquid crystal TV.

Japanese Unexamined Patent Application Publication No. 2004-355865 discloses a technique using a switch and control circuit for resetting a latch state if a controlling IC for controlling a main power supply circuit is shifted to the latch state due to temporary blackout.

The technique as disclosed in Japanese Unexamined Patent Application Publication No. 2004-355865 has the following problem. That is, the publication does not contain any reference to an inverter circuit supplied with power from the main power supply circuit through a main transformer. Thus, in the configuration including a controlling IC on the inverter side as well as on the main power supply circuit side, it is necessary to take a countermeasure against the temporary blackout for the inverter controlling IC on the inverter side.

BRIEF SUMMARY OF THE INVENTION

The present invention discloses a liquid crystal TV with use of an inverter-circuit power supply circuit for supplying power to an inverter circuit supplied with a power supply voltage from a main power supply circuit through a main transformer and having a protective function of temporarily cutting off a backlight driving signal to thereby redrive the inverter circuit especially when the power supply voltage becomes lower than a specified voltage to stop the inverter circuit. The inverter-circuit power supply circuit can redrive the inverter circuit without turning on a main power again upon temporary blackout.

According to an aspect of the present invention, a liquid crystal television, comprising: a backlight for illuminating a liquid crystal panel to display an image; a main power supply circuit for rectifying an AC power into a DC power supply voltage; an inverter circuit for boosting the power supply voltage supplied from the main power supply circuit through a transformer and supplying power to the backlight; an inverter controlling integrated circuit (IC) for controlling a voltage boosted by the inverter circuit based on a backlight driving signal and causing, if the power supply voltage from the main power supply circuit is lower than a specified voltage, the inverter circuit to stop boosting a voltage;

a protective circuit having a protective function of temporarily cutting off the backlight driving signal to redrive the inverter circuit when the power supply voltage becomes lower than the specified voltage to stop driving the inverter circuit; and a microcomputer for outputting the backlight driving signal to the inverter controlling IC, the inverter circuit including a power recovery circuit for temporarily cutting off the backlight driving signal output from the microcomputer when the power supply voltage of the main power supply circuit drops due to temporary blackout, based on a value of the power supply voltage from the main power supply circuit, and restarting supply of the backlight driving signal to the protective circuit when the value of the power supply voltage is increased up to the specified voltage or higher, the power recovery circuit including:

a power supply voltage determining circuit for comparing the power supply voltage from the main power supply circuit with the specified voltage by use of a Zener diode, and outputting a determination current if the power supply voltage is equal to or higher than the specified voltage;

a backlight driving signal cutoff circuit for outputting, if the determination current is not output, the power supply voltage from the main power supply circuit to a base of a second transistor by use of a resistor, and emitting the backlight driving signal from the microcomputer to a ground terminal connected to an emitter of the second transistor to cut off the backlight driving signal; and a switchover circuit for emitting, if the determination current is output to a base of a first transistor, a current based on the power supply voltage from the main power supply circuit to a ground terminal connected to an emitter of the first transistor to cut off supply of the power supply voltage to the base of the second transistor through the resistor to restart supply of the backlight driving signal to the protective circuit.

According to this configuration, the inverter circuit applies an output voltage to the backlight based on DC power supplied from the main power supply circuit, and the protective circuit of the inverter controlling IC has a protective function of stopping boosting if the power supply voltage from the main power supply circuit is lower than a specified value due to temporary blackout. The protective function of the protective circuit can be cancelled by temporarily cutting off the backlight driving signal. The inverter circuit includes the power recovery circuit to cancel the protective function of the protective circuit upon temporary blackout. If the power supply voltage from the main power supply circuit lowers due to temporary blackout, the power recovery circuit temporarily cuts off the backlight driving signal from the microcomputer and restarts the supply of the signal to the protective circuit when the power supply voltage is increased up to the specified voltage or higher. To that end, the power recovery circuit includes the power supply voltage determining circuit, the backlight driving signal cutoff circuit, and the switchover circuit, and executes ON/OFF control over a backlight driving voltage from the microcomputer based on the power supply voltage from the main power supply circuit.

According to another aspect of the invention, A backlight power supplying circuit, comprising:

an inverter circuit for boosting a power supply voltage supplied from a main power supply circuit and supplying power to a backlight;

an inverter controlling integrated circuit (IC) for controlling a voltage boosted by the inverter circuit based on a backlight driving signal and causing, if the power supply voltage from the main power supply circuit is lower than a specified voltage, the inverter circuit to stop boosting a voltage;

a protective circuit for having a protective function of temporarily cutting off the backlight driving signal to redrive the inverter circuit when the power supply voltage becomes lower than the specified voltage to stop driving the inverter circuit; and a control unit for outputting the backlight driving signal to the inverter controlling IC, the inverter circuit for including a power recovery circuit for temporarily cutting off the backlight driving signal output from the microcomputer when the power supply voltage of the main power supply circuit drops due to temporary blackout, based on a value of the power supply voltage from the main power supply circuit, and restarting supply of the backlight driving signal to the protective circuit when the value of the power supply voltage is increased up to the specified voltage or higher, the power recovery circuit including:

a power supply voltage determining circuit for comparing the power supply voltage from the main power supply circuit with the specified voltage by use of a Zener diode, and outputting a determination current if the power supply voltage is equal to or higher than the specified voltage;

a backlight driving signal cutoff circuit for turning off the backlight driving signal to the protective circuit by emitting to a ground the backlight driving signal outputted from the control unit when the determination current is not inputted, a switchover circuitry for turning on the backlight driving signal outputted to the backlight driving signal the protective circuit by intercepting that the supply voltage is outputted to the backlight driving signal cutoff circuit if the determination current is inputted, According to this configuration, the inverter circuit applies an output voltage to the backlight based on DC power supplied from the main power supply circuit, and the protective circuit of the inverter controlling IC has a protective function of stopping boosting if the power supply voltage from the main power supply circuit is lower than a specified value due to temporary blackout. The protective function of the protective circuit can be cancelled by temporarily cutting off the backlight driving signal. The inverter circuit includes the power recovery circuit to cancel the protective function of the protective circuit upon temporary blackout. If the power supply voltage from the main power supply circuit lowers due to temporary blackout, the power recovery circuit temporarily cuts off the backlight driving signal from the microcomputer and restarts the supply of the signal to the protective circuit when the power supply voltage is increased up to the specified voltage or higher. To that end, the power recovery circuit includes the power supply voltage determining circuit, the backlight driving signal cutoff circuit, and the switchover circuit, and executes ON/OFF control over a backlight driving voltage from the microcomputer based on the power supply voltage from the main power supply circuit.

Hence, it is possible to accomplish an inverter-circuit power supply circuit for supplying power to an inverter circuit having a protective function of temporarily cutting off a backlight driving signal to thereby redrive the inverter circuit especially when the power supply voltage becomes lower than a specified voltage to stop the inverter circuit. The inverter-circuit power supply circuit can redrive the inverter circuit without turning on a main power again upon temporary blackout.

According to another aspect of the invention, the backlight power supplying circuit according to claim 2, wherein the power supply voltage determining circuit determines whether or not the power supply voltage is not lower than a specified voltage by use of a Zener diode, When the determination current is outputted, the backlight driving signal cutoff circuit outputs the supply voltage outputted from the main power circuit to the base of a transistor, the backlight driving signal outputted from the control unit is emitted to a ground through an emitter from the collector of the transistor, and when the determination current is outputted, the switchover circuit turns on the backlight driving signal which is intercepting the supply voltage being outputted to the base of the transistor, and is outputted to the protection circuit.

According to this configuration, the power supply voltage determining circuit compares the power supply voltage with the specified voltage by use of a Zener diode. Further, the backlight driving signal cutoff circuit switchingly connects/disconnects between the collector and emitter of the second transistor based on the power supply voltage to thereby emit the backlight driving signal from the control unit to the ground terminal. The switchover circuit outputs a determination current from the power supply voltage determining circuit to the base of the first transistor to thereby control the second transistor to emit the backlight driving signal to the ground terminal.

Hence, the power recovery circuit can be configured by any available Zener diode or transistor, so the circuit configuration costs low. In addition, the specified voltage can be changed by replacing the Zener diode, and conditions of the power recovery circuit can be easily changed.

Further, in the backlight power supplying circuit according to the present invention, the protective circuit is realized based on control logic of the inverter controlling IC.

According to this configuration, the protective circuit may be realized based on control logic of the inverter controlling IC.

Hence, the present invention is applicable to an inverter controlling IC incorporating a protective circuit.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purpose of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

DETAILED DESCRIPTION OF THE INVENTION

A backlight power supplying circuit according to the present invention will be described in detail below based on a liquid crystal TV including the backlight power supplying circuit.

Figure 1:
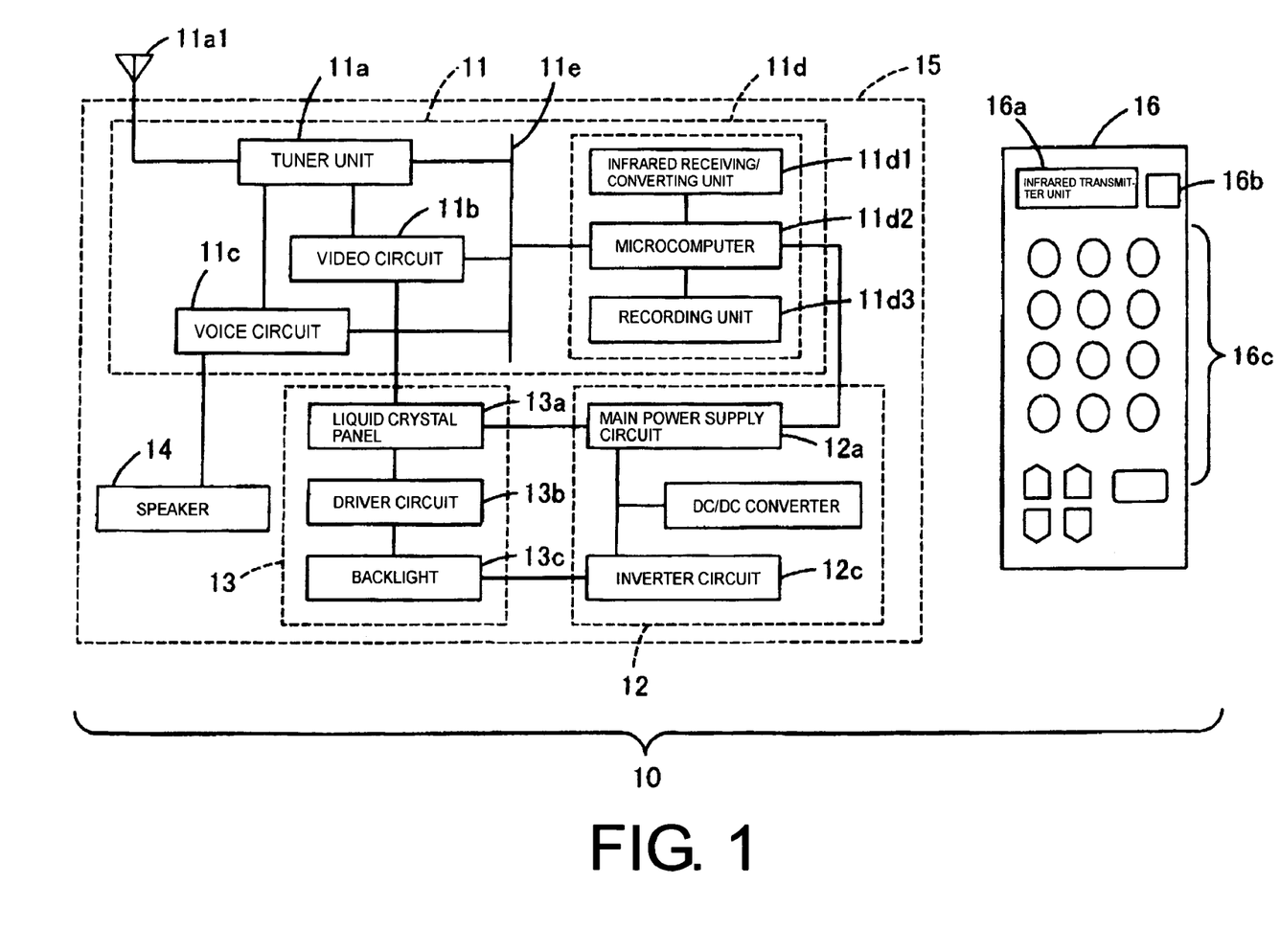
FIG. 1 is a block diagram of a liquid crystal TV.

Hereinafter, embodiments of the present invention will be described in the following order.
(1) Configuration of Liquid Crystal TV
(2) Configuration of Backlight power supplying circuit
(3) Modified Example 1
(4) Conclusion (1) Configuration of Backlight Power Supplying Circuit Referring to FIGS. 1 to 5, a liquid crystal TV 10 with use of the backlight power supplying circuit according to the present invention is described below. FIG. 1 is a block diagram of the liquid crystal TV 10 of this device. As shown in FIG. 1, the liquid crystal TV 10 includes a display device 15 including a digital substrate 11, an analog substrate 12, a liquid crystal display 13, and a speaker 14, and a remote controller 16. Functions of each part are described next.

On the digital substrate 11, a tuner unit 11a, a video circuit 11b, a voice circuit 11c, and a control unit 11d are formed. As shown in FIG. 1, the components of the digital substrate 11 are connected to the control unit 11d through a bus 11e, and execute their functions under the control of the control unit 11d. The control unit 11d includes a microcomputer 11d2 as a control center, a recording unit 11d3 such as a ROM or RAM, and an infrared receiving/converting unit 11d1 receiving an actuating signal from the remote controller 16. If an operation key 16c of the remote controller 16 is pressed, an infrared transmitter unit 16a transmits an infrared signal to an infrared receiving/converting unit 11d1, and then the infrared receiving/converting unit 11d1 converts the received infrared signal into an actuating signal of a predetermined voltage level to output the signal to the microcomputer 11d2. In response to the actuating signal from the infrared receiving/converting unit 11d1, the microcomputer 11d2 outputs control signals to each component on the digital substrate 11 through the bus 11e based on control programs recorded on the recording unit 11d3.

Receiving the actuating signal from the control unit 11d, the tuner unit 11a selects only a specific frequency band of airwaves received by an antenna 11a1 to adjust chroma based on the airwaves of the selected specific frequency band to generate a video signal and a voice signal. The generated video signal is sent to the video circuit 11b, and the voice signal is sent to the voice circuit 11c. The tuner unit 11a of this device may receive analog broadcasting based on a PLL method, both analog broadcasting and digital broadcasting, or only digital broadcasting.

The video circuit 11b receives the generated video signal to generate RGB signals corresponding to RGB gray scales for displaying a screen and perform predetermined signal processing on the generated RGB signals. Further, the video circuit 11b decomposes the RGB signals in accordance with the number of pixels of a liquid crystal panel 13b as described later and then outputs the signals to the liquid crystal panel 13b.

The voice circuit 11c receives the generated voice signal and performs signal processing such as amplification on the voice signal based on a control signal from the control unit 11d. The voice signal subjected to the signal processing is sent to the speaker 14 and output as voice afterward.

The liquid crystal display 13 includes the liquid crystal panel 13b having pixels of liquid crystal material arranged in matrix, a driver circuit 13a for applying a driving voltage to the liquid crystal panel 13b, and a backlight 13c for illuminating the liquid crystal panel 13b from the back. The driver circuit 13a applies a driving voltage as an applied voltage to predetermined pixels of the liquid crystal panel 13b on the row basis, based on the RGB signals that are divided for each pixel of the liquid crystal panel 13b by the video circuit 11b. In the liquid crystal panel 13b, pixels of liquid crystal material are arranged in matrix; the orientation of crystal grains of the liquid crystal material is changed in accordance with the driving voltage. Such pixels include a set of three pixels corresponding to RGB. When the driver circuit 13a applies a voltage, the transmittance of light from the backlight 13c is changed in the specific pixels to thereby change RGB gray scales and display a color screen.

As described above, the backlight 13c illuminates the liquid crystal panel 13b from the back. The backlight 13c serves as a light source for light transmitted through pixels. As a fluorescent tube used for the backlight 13c, a cold-cathode tube can be used. Regarding a tube shape, the tube may be a U-shaped tube, a straight tube, or a pseudo U-shaped tube.

The analog substrate 12 supplies power necessary for the above digital substrate 11 or liquid crystal display 13. To give a brief explanation of functions of the analog substrate 12, the substrate 12 rectifies commercially available 100-volt power, followed by isolation with the transformer. Then, the substrate 12 outputs the power to each DC/DC converter side. On the DC/DC converter side, a voltage is boosted or reduced to thereby generate and supply a stabilized AC power to the digital substrate 11 or the liquid crystal display 13.

Figure 2:
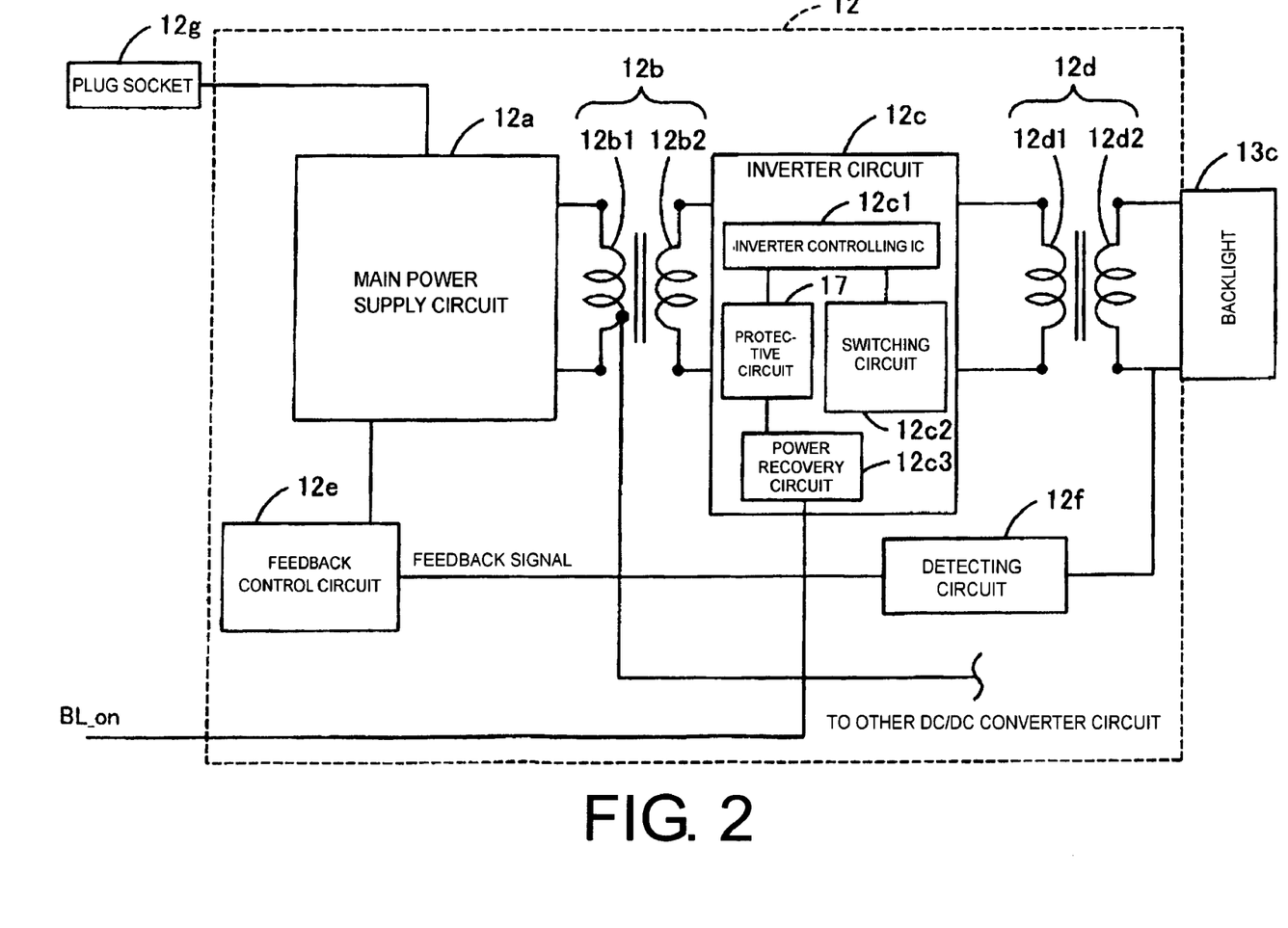
FIG. 2 is a block diagram of an analog substrate.

FIG. 2 is a block diagram of the analog substrate 12. As shown in FIG. 2, the analog substrate 12 includes a main power supply circuit 12a, a main transformer 12b, an inverter circuit 12c, a transformer 12d, a detecting circuit 12f, and a feedback control circuit 12e. Although not shown, there are provided plural DC/DC converters that generate a predetermined AC power based on the power supplied from the main power supply circuit 12a through the main transformer 12b, but the present invention relates to the inverter circuit 12c, so description about the converters is omitted here. A function of the analog substrate 12 is described below.

The main power supply circuit 12a converts the commercially available 100V AC power supplied from the plug socket 12g into a DC power after full-wave rectification, and then applies the DC power to the primary coil 12b1 of the main transformer 12b. A rectifying function of the main power supply circuit 12a of the present invention is realized by a bridge circuit including a diode or the like. A secondary coil 12b2 having a winding ratio different from that of the primary coil 12b1 is provided on the opposite side of the primary coil 12b1 of the main transformer 12b, and an electromotive force is generated on the secondary coil 12b2 due to mutual induction. Further, the electromotive force generated on the secondary coil 12b2 is applied to the inverter circuit 12c or each DC/DC converter (not shown) through voltage division.

The inverter circuit 12c boosts a voltage with the switching circuit 12c2 based on the voltage applied by the secondary coil 12b2. The switching circuit 12c2 is composed of four MOSFETs, and the inverter controlling IC12c1 controls the four MOSFETs to thereby generate an AC power having positive half cycle and negative half cycle of sine waves based on the DC power. Further, the inverter circuit 12c incorporates the protective circuit 17 and a power recovery circuit 12c3 as described below. Provided that the power supply voltage of the secondary coil 12b2 is lower than the specified voltage, and the inverter circuit 12c is stopped, the protective circuit 17 has a protective function of temporarily cutting off the supply of the backlight driving signal from the microcomputer 11d2 to redrive the inverter circuit.

The switching circuit 12c2 is driven by applying a divided one of the voltage value of the secondary coil 12b2 to the inverter controlling IC12c1 and applying a signal BL_on as a backlight driving signal output from the microcomputer 11d2 of the digital substrate 11 to the protective circuit 17. In the embodiment of the present invention, a voltage of 24 volts generated with the main transformer 12b is divided, and the divided voltage of 5 volts is applied to the inverter controlling IC12c2.

The AC power generated with the switching circuit 12c2 is applied to the primary coil 12d1 of the transformer 12d. A secondary coil 12d2 having a winding ratio different from that of the primary coil 12d1 is provided on the opposite side of the primary coil 12d1, and an electromotive force is also applied to the secondary coil 12d2 due to mutual induction to thereby supply power to the backlight 13c. Further, the detecting circuit 12f is connected to the secondary coil 12d2 of the backlight 13c. The detecting circuit 12f determines a voltage value output to the backlight 13c. If the output voltage value is larger than a reference value, a feedback signal is output to the feedback control circuit 12e. The feedback control circuit 12e receives the feedback signal and executes feedback control to adjust a voltage value output from the main power supply circuit 12a to the primary coil 12b1.

(2) Configuration of Inverter Circuit

Figure 3:
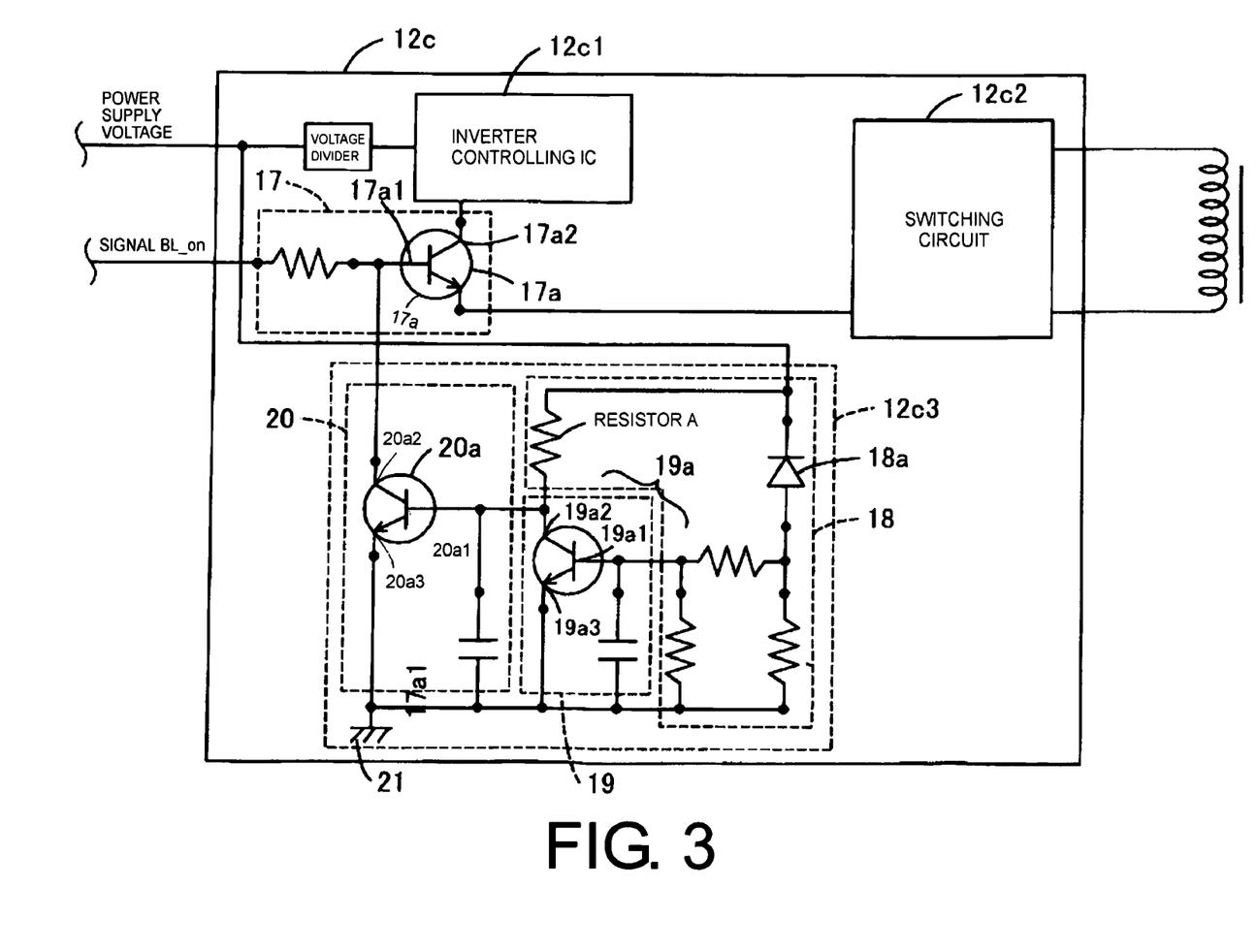
FIG. 3 is an enlarged view of an inverter circuit.

FIG. 3 is an enlarged view of the inverter circuit. As shown in FIG. 3, the power recovery circuit 12c3 includes a power supply voltage determining circuit 18, a backlight driving signal cutoff circuit 19, and a switchover circuit 20. The power supply voltage determining circuit 18 compares a power supply voltage from the main power supply circuit 12a with a specified voltage through a Zener diode 18a. If the power supply voltage is equal to or higher than the specified voltage, a determination current is output. The backlight driving signal cutoff circuit 19 outputs the power supply voltage from the main power supply circuit 12a to a base 20a1 of the second transistor 20a through a resistor A, so a backlight driving signal BL_on output from the microcomputer 11d2 is emitted to a ground terminal 21 from a collector 20a2 of the second transistor 20a through an emitter 20a3 to cut off the signal BL_on output to the protective circuit 17. The switchover circuit 20 outputs a determination current from the Zener diode 18a to the base 19a1 of the first transistor 19a. In this way, a current corresponding to the power supply voltage output from the main power supply circuit 12a is emitted from the collector 19a2 of the first transistor 19a to the ground terminal 21 through the emitter 19a3 to cut off the supply of the power supply voltage to the base 20a1 of the second transistor 20a through the resistor aA and supply the signal BL_on to the protective circuit 17.

Regarding the specifications of the Zener diode 18a, a breakdown current is allowed to flow in accordance with a voltage value of 20 volts or higher. If a voltage supplied from the main power supply circuit 12a is below 20 volts, it is determined that temporary blackout occurs. Further, the first transistor 19a and the second transistor 20a are npn type transistors. In this way, a voltage from the main power supply circuit 12a is lowered by use of the Zener diode and the npn type transistors, so a circuit can be configured by any commercially available inexpensive product. Further, if the Zener diode is used, a threshold value for determining that temporary blackout occurs can be readily changed by replacing the Zener diode.

Figure 4:
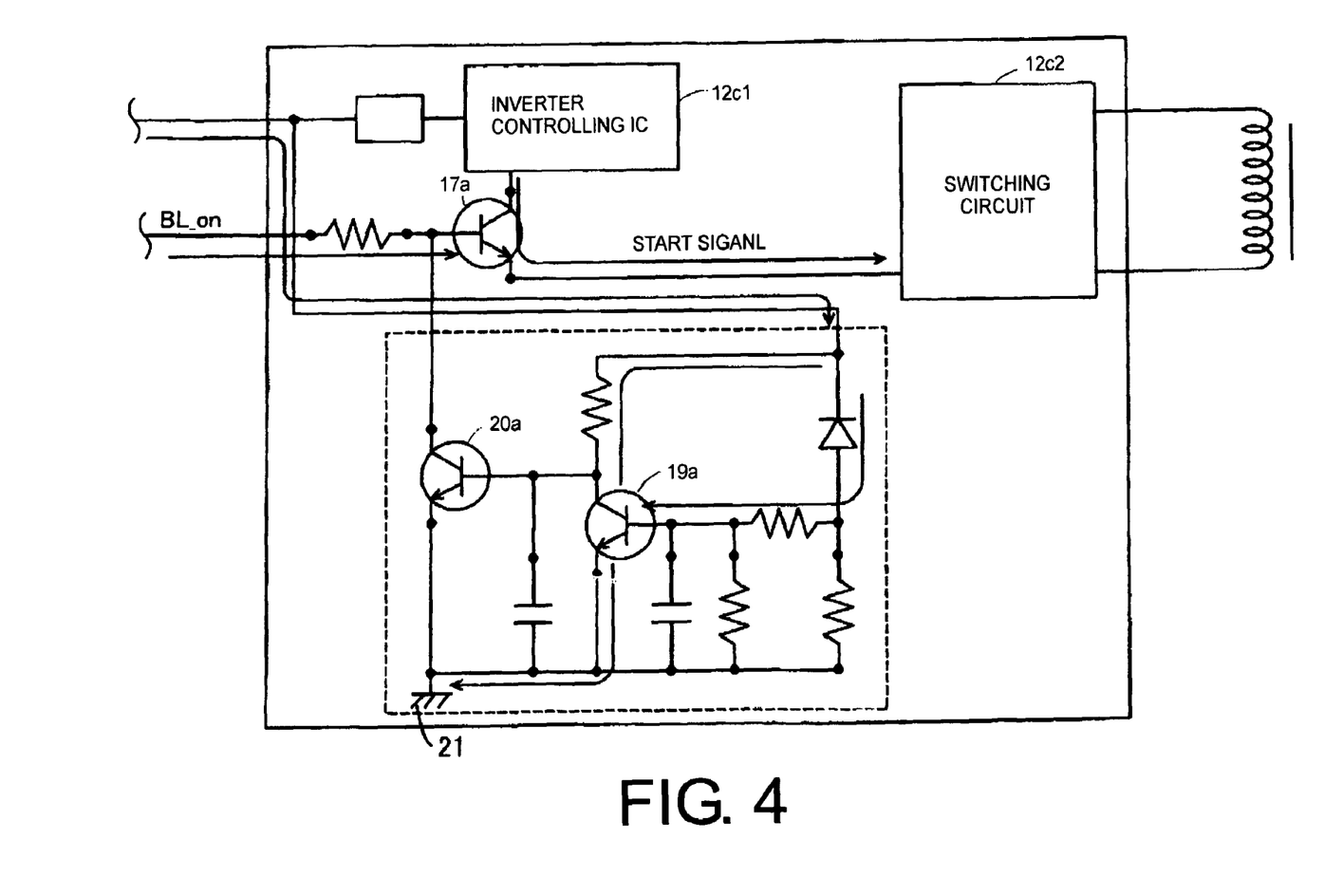
FIG. 4 shows how a current flows when a power supply voltage is 20 volts or higher.
Figure 5:
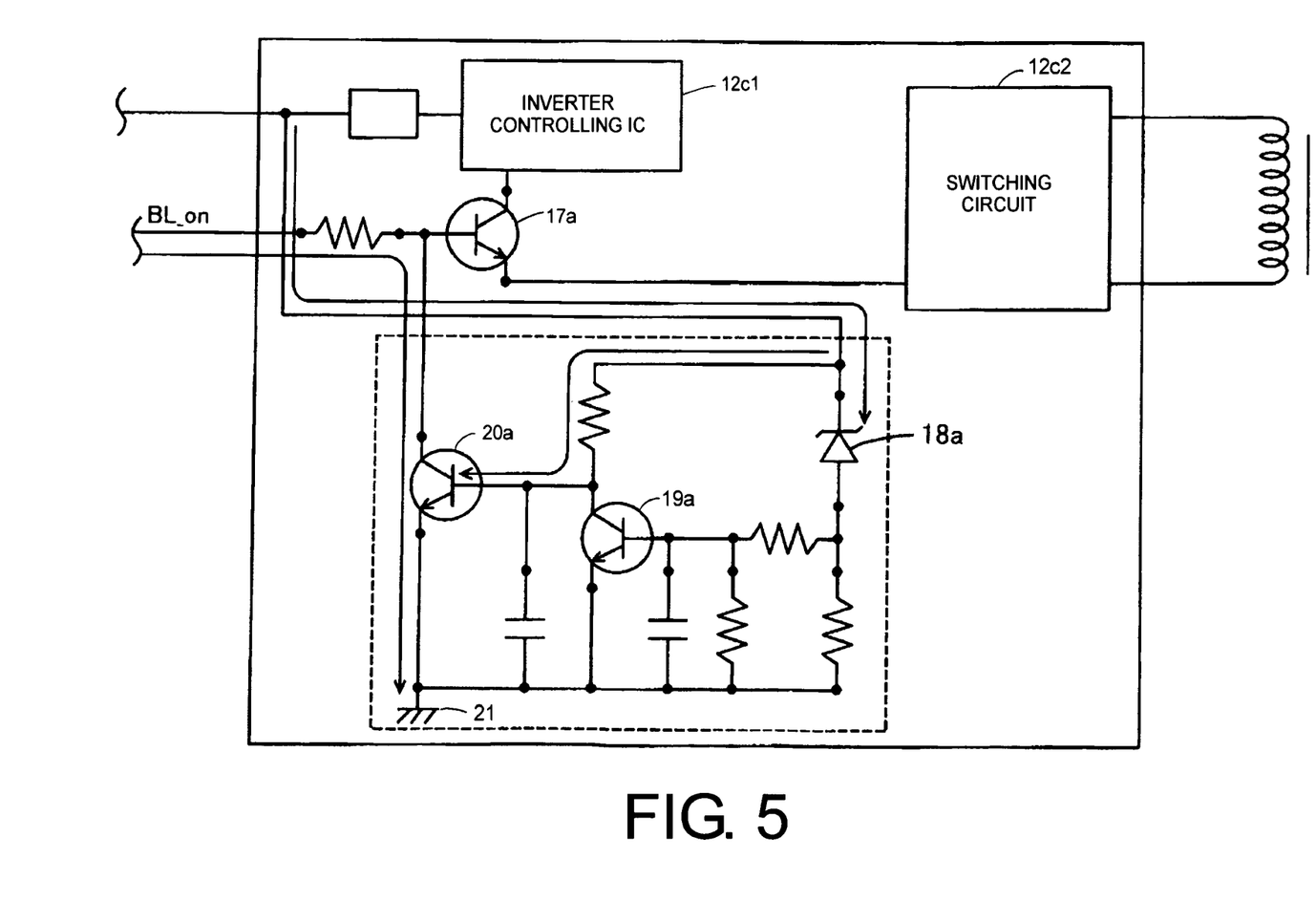
FIG. 5 shows how a power supply voltage of 20 volts or lower is applied.

Functions of the power recovery circuit 12c3 are specifically described below. FIG. 4 shows functions of the power recovery circuit 12c3 under the condition that a voltage of 20 volts or higher is supplied from the main power supply circuit. FIG. 5 shows functions of the power recovery circuit 12c3 under the condition that a voltage of 20 volts or lower is supplied from the main power supply circuit. As shown in FIG. 4, if a voltage supplied from the main power supply circuit 12a is 20 volts or higher, the power supply voltage causes breakdown of the Zener diode 18a, and the Zener diode 18a outputs a breakdown current to the base 19a1 of the first transistor 19a. Further, the power supply voltage is divided and output to the resistor A and then applied to the collector 19a2 of the first transistor 19a. At this time, a breakdown current flows through the base 19a1 of the first transistor 19a, so a current flowing through the collector 19a2 flows into the emitter 19a3 and is then output from the ground terminal 21. At this time, the signal BL_on flows through the base 17a1 of the transistor 17a of the protective circuit 17, so an actuating signal output from the inverter controlling IC12c1 is sent to the switching circuit 12c2. As a result, the switching circuit 12c2 generates an output voltage for driving the backlight 13c.

Referring next to FIG. 5, if a voltage supplied from the main power supply circuit 12a is 20 volts or lower, the power supply voltage of the main power supply circuit 12a is applied to the Zener diode 18a. However, since the power supply voltage is 20 volts or lower, the Zener diode 18a supplies no breakdown current. Hence, a current generated based on the divided power supply voltage at the resistor A does not flow through the first transistor 19a but through the base 20a1 of the second transistor 20a. Further, the signal BL_on output from the microcomputer 11d2 is not output to the base 17a1 of the protective circuit 17 but to the ground terminal 21 of the second transistor 20a since the continuity between the collector 20a2 and the emitter 20a3 of the second transistor 20a is attained. Hence, an actuating signal of the inverter controlling IC12c1 is not output to the transistor 17a of the protective circuit 17 and the switching circuit 12c2 is not driven. Such reduction in voltage supplied from the main power supply circuit 12a is only temporary, and the supplied voltage returns to 20 volts or higher at once, with the result that the signal BL_on supplied from the microcomputer 11d2 is switched from OFF state to ON state, and the inverter controlling IC12c2 restarts controlling the driving of the switching circuit 12c2.

(3) Modified Example

In the above inverter circuit 12c, the protective circuit 17 is integrated by use of the transistor 17a but may be integrated by use of a logic circuit in the inverter controlling IC12c1. If the protective circuit 17 is configured by the logic circuit in the inverter controlling IC12c1, the above functions can be realized by connecting an input terminal for the signal BL_on from the microcomputer 11d2 of the inverter controlling IC12c1 to the first transistor 19a of the backlight driving signal cutoff circuit 19 of the power recovery circuit 12c3.

(4) Conclusion

As set forth above, it is possible to provide a liquid crystal TV with use of an inverter-circuit power supply circuit for supplying power to an inverter circuit supplied with a power supply voltage from a main power supply circuit through a main transformer and having a protective function of temporarily cutting off a backlight driving signal to thereby redrive the inverter circuit especially when the power supply voltage becomes lower than a specified voltage to stop the inverter circuit. The inverter-circuit power supply circuit cuts off the supply of backlight driving signals from the microcomputer by use of a power recovery circuit upon temporary blackout and redrives the inverter circuit without turning on the main power again.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, proximal, distal, etc. have been used for convenience purposes only and are not intended to imply any particular fixed direction or orientation. Instead, they are used to reflect relative locations and/or directions/orientations between various portions of an object.

What is claimed is:

1. A liquid crystal television, comprising:
    a backlight for illuminating a liquid crystal panel to display an image;
    a main power supply circuit for rectifying an AC power into a DC power supply voltage;
    an inverter circuit for boosting the power supply voltage supplied from the main power supply circuit through a transformer and supplying power to the backlight;
    an inverter controlling integrated circuit (IC) for controlling a voltage boosted by the inverter circuit based on a backlight driving signal and causing, if the power supply voltage from the main power supply circuit is lower than a specified voltage, the inverter circuit to stop boosting a voltage;
    a protective circuit having a protective function of temporarily cutting off the backlight driving signal to redrive the inverter circuit when the power supply voltage becomes lower than the specified voltage to stop driving the inverter circuit; and
    a microcomputer for outputting the backlight driving signal to the inverter controlling IC,
    the inverter circuit including a power recovery circuit for temporarily cutting off the backlight driving signal output from the microcomputer when the power supply voltage of the main power supply circuit drops due to temporary blackout, based on a value of the power supply voltage from the main power supply circuit, and restarting supply of the backlight driving signal to the protective circuit when the value of the power supply voltage is increased up to the specified voltage or higher,
    the power recovery circuit including:
    a power supply voltage determining circuit for comparing the power supply voltage from the main power supply circuit with the specified voltage by use of a Zener diode, and outputting a determination current if the power supply voltage is equal to or higher than the specified voltage;
    a backlight driving signal cutoff circuit for outputting, if the determination current is not output, the power supply voltage from the main power supply circuit to a base of a second transistor by use of a resistor, and emitting the backlight driving signal from the microcomputer to a ground terminal connected to an emitter of the second transistor to cut off the backlight driving signal; and
    a switchover circuit for emitting, if the determination current is output to a base of a first transistor, a current based on the power supply voltage from the main power supply circuit to a ground terminal connected to an emitter of the first transistor to cut off supply of the power supply voltage to the base of the second transistor through the resistor to restart supply of the backlight driving signal to the protective circuit.

2. A backlight power supplying circuit, comprising:
    an inverter circuit for boosting a power supply voltage supplied from a main power supply circuit and supplying power to a backlight;
    an inverter controlling integrated circuit (IC) for controlling a voltage boosted by the inverter circuit based on a backlight driving signal and causing, if the power supply voltage from the main power supply circuit is lower than a specified voltage, the inverter circuit to stop boosting a voltage;

a protective circuit for having a protective function of temporarily cutting off the backlight driving signal to redrive the inverter circuit when the power supply voltage becomes lower than the specified voltage to stop driving the inverter circuit; and a control unit for outputting the backlight driving signal to the inverter controlling IC, the inverter circuit for including a power recovery circuit for temporarily cutting off the backlight driving signal output from the microcomputer when the power supply voltage of the main power supply circuit drops due to temporary blackout, based on a value of the power supply voltage from the main power supply circuit, and restarting supply of the backlight driving signal to the protective circuit when the value of the power supply voltage is increased up to the specified voltage or higher, the power recovery circuit including:

a power supply voltage determining circuit for comparing the power supply voltage from the main power supply circuit with the specified voltage by use of a Zener diode, and outputting a determination current if the power supply voltage is equal to or higher than the specified voltage;

a backlight driving signal cutoff circuit for turning off the backlight driving signal to the protective circuit by emitting to a ground the backlight driving signal outputted from the control unit when the determination current is not inputted, a switchover circuitry for turning on the backlight driving signal outputted to the backlight driving signal the protective circuit by intercepting that the supply voltage is outputted to the backlight driving signal cutoff circuit if the determination current is inputted.

3. The backlight power supplying circuit according to claim 2, wherein the power supply voltage determining circuit determines whether or not the power supply voltage is not lower than a specified voltage by use of a Zener diode, When the determination current is outputted, the backlight driving signal cutoff circuit outputs the supply voltage outputted from the main power circuit to the base of a transistor, the backlight driving signal outputted from the control unit is emitted to a ground through an emitter from the collector of the transistor, and when the determination current is outputted, the switchover circuit turns on the backlight driving signal which is intercepting the supply voltage being outputted to the base of the transistor, and is outputted to the protection circuit.

4. The backlight power supplying circuit according to claim 2, wherein the protective circuit is realized based on control logic of the inverter controlling IC.

\* \* \* \* \*